Patented Aug. 2, 1927.

1,637,451

UNITED STATES PATENT OFFICE.

RICHARD MOLDENKE, OF WATCHUNG, NEW JERSEY.

PROCESS OF TREATING ALUMINOUS ORES.

No Drawing.   Application filed July 9, 1925. Serial No. 42,579.

This invention relates to the treatment of aluminous ores and the salient object of the invention is the production of aluminum hydroxide in a particularly pure state, in order that the same may be successfully used in the production of metallic aluminum by the customary electrolytic reduction in the presence of carbon.

With the foregoing object in view, a suitable aluminous ore, such as "alunite," is first ground and treated substantially in accordance with either of the prior patents to the applicant herein No. 1,282,273 dated October 22, 1918 or to Edel Moldenke, No. 1,457,787, dated June 5, 1923.

Briefly stated, these processes involve a treatment of alunite, for the purpose of rendering the valuables therein soluble, and consists in mixing the comminuted ore with sulphuric acid to form a pasty mass, thereupon heating the same in such manner that the resulting material may be formed into a cake, thereafter breaking the cake into pieces and subjecting it to heat at a higher temperature than the previous heating and finally extracting the valuables therefrom by leaching with water. The potash and alumina, together with any soda present, are converted into sulphates and separated from the silica.

The solution, produced as above described, is thereafter evaporated to such extent as to crystallize out potash alum, leaving behind all the aluminum sulphate and any soda alum present, together with any iron which might have been present in the mother liquor from the potash alum. Sufficient ammonium sulphate (or potassium sulphate, or potassium and ammonium sulphates mixed), is now added to the liquor, whereupon the ammonium aluminum alum is crystallized out (or more potash alum or potash and ammonia alum mixed) depending on the particular procedure adopted.

The foregoing process removes all iron from the recovered alums and the mother liquors may be used over again until they contain so much iron that they may be discarded. It will thus be apparent that all the values in the alunite are obtained, in a substantially pure state in the form of potash ammonium alum and ammonium aluminum alum.

I now pass ammonia, preferably produced synthetically, either through the solution of the alums or add ammonia dissolved in water, to said solution or the solution of ammonia may be added to the alum solution hot or cold; or I may pass dry ammonia gas over the alums in layers, whichever way is found most convenient and practical, under the conditions of operation, for producing granular alumina from the hydrate. The aluminum hydrate obtained by leaching, instead of being of the usual gelatinous form, is, as suggested, in granular condition, and, therefore, is much more effective and suitable for its intended purposes.

It will be manifest that the aluminum hydrate is produced as a precipitate, the filtrate containing potash and ammonium sulphates. Said filtrate may be treated in such manner, by fractional crystallization or otherwise, so as to separate therefrom the potassium and ammonium sulphates and enable them to be used in the fertilizer industry or in such other commercial fields which are open to their use.

The aluminum hydroxide obtained as described is exceptionally pure in that it is almost entirely free from the very troublesome impurities ordinarily contained therein, namely, silicon and iron. Accordingly, it is in condition for successful use for its various intended purposes, mainly for use in the production of metallic aluminum by manipulating it electrolytically in a cryolite bath, as now practised.

The foregoing process is the preferred and typical method of practising the invention, but is not intended as being exclusive as to details of operation, or slight modifications therein, or as to the employment of equivalent operations and materials, the scope of the invention being commensurate with the appended claims.

Having thus fully described the invention, what I claim as new and desire to secure by Letters Patent is:

1. The process of recovering aluminum in the form of alumina from ores containing aluminum and potassium which comprises treating the said ores with sulphuric acid to convert the aluminum and potassium and sodium compounds associated therewith into sulphates of such metals, separating the potassium alum thus formed from the mixture, treating the mixture containing aluminum with an ammonium compound capable of converting the aluminum into ammonium aluminum alum, separating the ammonium aluminum alum thus formed, and treating the potassium alum and the aluminum alum thus produced with ammonia to convert the aluminum into aluminum hydrate.

2. The process of recovering aluminum in the form of alumina from ores containing aluminum and potassium which comprises treating the said ores with sulphuric acid, separating the potassium aluminum compound thus formed from the mixture, treating the mixture containing aluminum with ammonium sulphate, separating the ammonium aluminum alum thus formed, treating the potassium aluminum compound and the aluminum alum thus produced with ammonia to convert the aluminum into aluminum hydrate, and separating the aluminum hydrate therefrom.

3. In the process of recovering aluminum in the form of alumina from ores containing aluminum and potassium, the steps which comprise treating the said ores with sulphuric acid, separating the potassium aluminum alum thus formed from the mixture, treating the mixture containing aluminum with an ammonium compound capable of converting the aluminum into ammonium aluminum alum, and treating the aluminum alum thus formed with ammonia to convert the aluminum into the form of a hydrate.

4. In the process of recovering aluminum from alunite ore, the steps which comprise converting a portion of the aluminum in said ore into a potassium alum, separating the potassium alum therefrom, converting the remaining portion of the aluminum contained in said ore into an ammonium aluminum alum and treating the potassium alum and ammonium alum thus formed with ammonia to convert same into aluminum hydrate.

5. In the process of recovering aluminum in the form of alumina from ores containing aluminum and potassium, the steps which comprise treating the said ores with sulphuric acid to convert the aluminum and potassium and sodium compounds associated therewith into the sulphates of such metals, separating the potassium alum thus formed from the mixture, treating the said mixture with ammonium sulphate to convert the aluminum into an ammonium aluminum alum, and treating the potassium and aluminum alums thus formed with ammonia to convert the aluminum into aluminum hydrate.

6. The process of recovering aluminum in the form of alumina from ores containing aluminum and potassium which comprises treating the said ores with sulphuric acid, separating the potassium aluminum compound from the mixture of soluble compounds thus formed, treating the mixture containing aluminum with an ammonium compound capable of converting the aluminum compound into ammonium aluminum alum, separating the impurities from the ammonium aluminum alum thus formed, admixing the potassium aluminum compound with the ammonium alum, and treating the said mixture with ammonia to convert the aluminum contained in said compounds into aluminum hydrate.

In testimony whereof I have signed the foregoing specification.

RICHARD MOLDENKE.